March 19, 1946.    R. T. HURLEY ET AL    2,397,009
OPTICAL APPARATUS
Filed Oct. 18, 1941
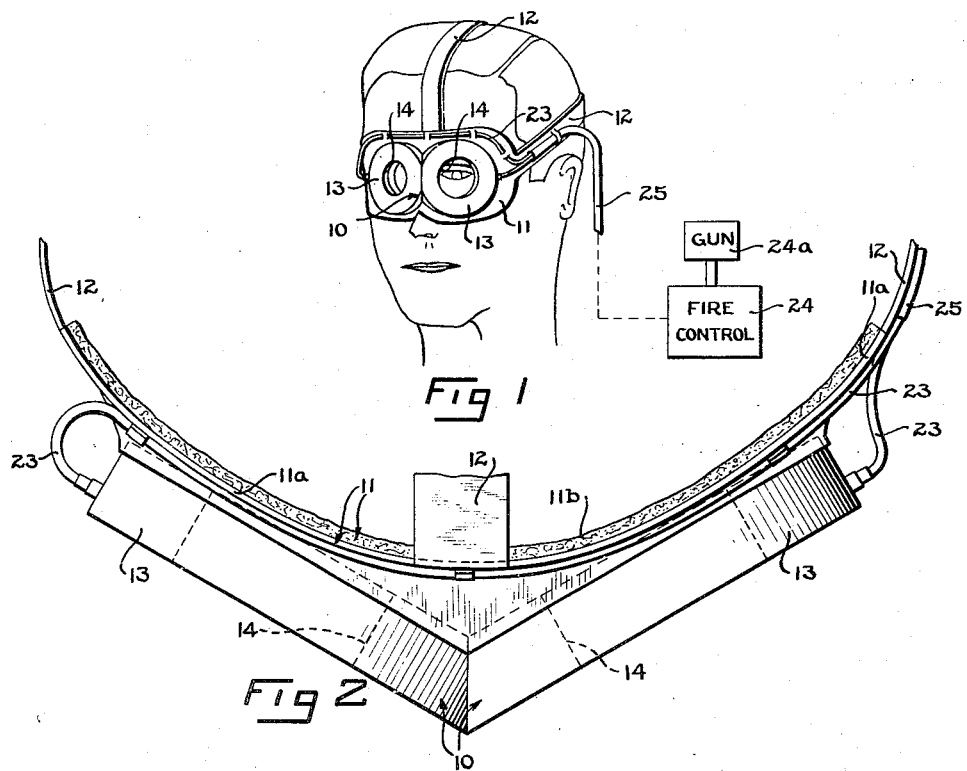
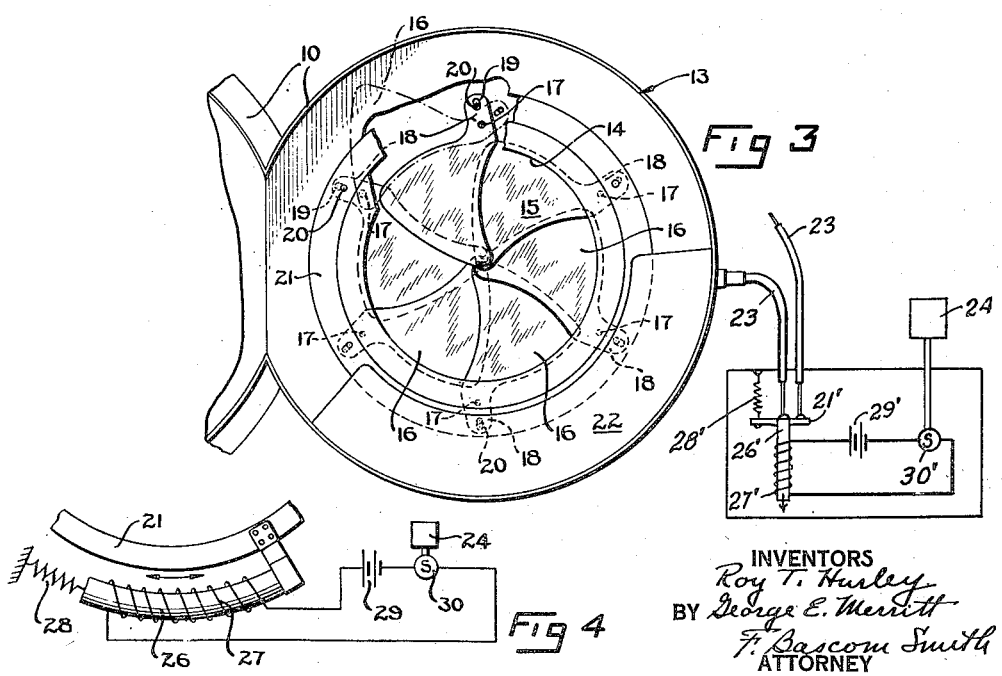
INVENTORS
Roy T. Hurley
George E. Merritt
BY F. Bascom Smith
ATTORNEY Patented Mar. 19, 1946

2,397,009

UNITED STATES PATENT OFFICE 2,397,009

OPTICAL APPARATUS

Roy T. Hurley, Westport, Conn., and George E. Merritt, Staten Island, N. Y., assignors to Bendix Aviation Corporation, South Bend, Ind., a corporation of Delaware Application October 18, 1941, Serial No. 415,508

9 Claims. (Cl. 2—14)

This invention relates to optical apparatus and more particularly to devices for reducing or eliminating the deleterious after-effects upon an observer's sight of intense flashes of light.

An observer at night, within whose field of vision intense flashes of light occur, is temporarily blinded by the flashes and the effect of blindness remains for some minutes after the flashes have ceased. This phenomenon, which is due to the exhaustion of visual purple from the eye, has seriously affected the efficiency of pilots, gunners and observers engaged in night combat flying. The flashes, for example, of a .50 caliber machine gun blind the pilot and as a result necessitate his withdrawal from combat after the firing of a single burst of projectiles. Several minutes must elapse before the aviator's eyes are again adjusted to the conditions of marginal illumination to such an extent as to make possible his continued participation in the battle, and during the period of non-participation the aviator is substantially helpless defensively and offensively. It is accordingly an object of the present invention to provide novel means whereby the above undesirable after-effects of intense flashes of light are substantially eliminated.

Another object is to provide a novel apparatus adapted to introduce light intercepting means in the field of vision of an observer.

A further object is to provide novel means for operating the above apparatus in a predetermined time relation to the operation of the fire control means of a gun.

Still another object is to provide a novel goggle or spectacle type device operable to shield the wearer from flashes produced by gunfire.

The above and further objects and novel features of the invention will more fully appear from the following detailed description when the same is read in connection with the accompanying drawing. It is to be expressly understood, however, that the drawing is for the purpose of illustration only and is not intended to define the limits of the invention, reference for this latter purpose being had primarily to the appended claims.

In the drawing, wherein like reference characters refer to like parts throughout the several views, Fig. 1 is a view in elevation of one form of apparatus embodying the present invention, said apparatus being shown operatively mounted on an observer's head;

Fig. 2 is a top plan view, with parts broken away, of the apparatus of Fig. 1;

Fig. 3 is a transverse view through one eye frame or housing of said apparatus, with parts broken away, showing a form of shutter mechanism suitable therefor; and Fig. 4 is a diagrammatic view of an alternative embodiment of the actuating mechanism for the shutter mechanism of Fig. 3.

The present invention is illustrated, by way of example, as comprising a spectacle-shaped frame 10 and a suitable face engaging member 11 surrounding said frame to prevent light leakage between the edges of said frame and the face, said member, as shown, being formed from a layer 11a of flexible material, such as leather (Fig. 2), having a lining 11b of yieldable cushioning material, for example, of felt, or fur. Suitable means, such as straps 12, are provided for attaching goggles 10, 11 to the wearer's head, said straps being formed with or secured to member 11.

In order to protect the eyes of the wearer from the after-effects of gun flashes, frame 10 is provided with novel means for interposing light-intercepting elements in the field of vision of the observer in timed relation to the firing of the gun. The novel means comprise two annular housings 13 rigidly secured to each other to constitute frame 10, said housings being angularly disposed relative to each other to provide a maximum field of vision for the wearer through openings 14 therein. To house the hereinafter described light-intercepting mechanism and yet provide a maximum field of vision for the observer including binocular vision of objects directly in front of the goggles, housings 13 are preferably disposed at an angle of approximately 120° to each other. To interpose light-intercepting means in the field of vision of an observer wearing the goggles, each of casings 13 contains a shutter 15, for example, of the type used in cameras, comprising a plurality of leaves or elements 16 (Fig. 3), each of said leaves being mounted for pivotal movement about a fixed axis 17 in the casing. An arm 18 is formed with each leaf and has a slot 19 therein which engages a pin 20 carried by a flat annular ring 21 mounted for limited rotary movement relative to the casing. Normally, each of leaves 16 is in the position shown by the one leaf illustrated in broken lines in Fig. 3, i. e., each is completely enclosed in casing 13. However, rotation of ring 21 imparts a pivotal movement to arms 18 and moves the leaves so as to cover the entire transverse area of opening 14.

To actuate ring 21 a suitable shutter-actuating mechanism 22, is provided and is operatively connected to said ring. The operation of mechanism 22 is preferably controlled by a Bowden wire 23 connected thereto in the well-known manner, a separate control wire and a separate actuating mechanism being provided for each shutter in the illustrated embodiment. Wires 23 are preferably secured to member 11 and guided thereby so as not to obstruct the vision of the observer.

In order to actuate shutters 15 in a predetermined time relation to the firing of the gun, whose flashes are visible to the wearer of goggles 10, 11, wires 23 are operatively connected to the fire control means 24 of the gun 24a. A flexible manifold 25 attached at one end to one of straps 12 and at the other end to control means 24 is preferably provided for wires 23 to protect the latter. The connection between said wires and said control means is such that actuation of the gun trigger to fire a burst of projectiles also actuates wires 23 and operates shutters 15 interposing shutter elements 16 into the field of vision of the wearer of the goggles. Elements 16 remain in the latter position until the trigger is released to discontinue the firing, at which time said elements are moved out of the field of vision of the observer by the release of wire controls 23.

Novel alternative means for actuating each of shutter rings 21 are shown in Fig. 4 and, as shown, comprise a core member or armature 26 secured to said ring and adapted to be actuated by a solenoid 27 in a direction to move said ring so as to close shutter 15. Suitable means, such as spring 28, are provided and are connected, for example, to one end of core member 26 in order to normally hold shutter 15 in open position. Solenoid 27 is connected in circuit with a source of electrical energy 29 and a switch 30, the operation of the latter being controlled by fire control means 24. As a result, when firing is to begin, control means 24 actuates switch 30 and closes the solenoid circuit, thereby energizing solenoid 27 and actuating core member 26 so as to move shutter 15 into closed position. Cessation of firing opens the solenoid circuit and deenergizes the solenoid, allowing spring 28 to move the shutter to open position. The operating mechanism shown in Fig. 4 is adapted to operate the shutters by the Bowden wire shown in Figs. 1, 2 and 3. In Fig. 3, for example, that mechanism comprises the fire control means 24 that operates a switch 30' to energize solenoid 27', attract armature 26', overcome spring 28' and close the shutters through Bowden wires 23, which are operatively attached to the armature and to the shutters.

In the elimination of the effects of intense flashes of light on the eyes of a pilot, gunner, or other observer in whose field of vision the flashes take place, it has been determined that best results are produced by providing an opaque shield for one eye and a dark filter for the other eye adapted to transmit therethrough only a small percentage of light. Accordingly, in the above-described embodiments, elements 16 of one of shutters 15 are opaque, preferably a thin lightweight metal, while the elements of the other shutter are of a filter material, preferably an optically clear plastic, such as the cellulose acetate plastic commercially known as "Tenite," and are a dark red or a dark blue color.

Accordingly, when control member 24 is actuated to fire the gun, shutters 15 are closed, thereby introducing an opaque screen in the field of vision of one eye and a dark filter in the field of the other eye of the wearer. The colored shutter reduces very materially the production of after-images while the opaque shutter entirely prevents the loss of visual purple. As a result, when the shutters are automatically removed from the field of vision of the observer's eyes at the completion of firing, there are no intense after-images transmitted by either eye to fuse in the brain with the direct images now transmitted by the previously opaque-covered eye. Accordingly, there is no fusion complex to destroy sharpness of vision even under the marginal illumination existent during night flying. It is psychologically advantageous to permit the aviator to have a limited degree of vision through one eye by means of the dark filter, although two opaque shutters would be more satisfactory in the elimination of after-images. The after-image produced by the partial vision of the one eye due to the filter is insufficient to confuse the clear image produced by the other eye when the shutters are opened, and yet this partial vision prevents the aviator from having the feeling of complete blindness during firing.

The present invention is also adaptable for utility with sighting mechanisms of the type through which the gunner sights on a target with one eye. A dark filter is preferably permanently positioned in front of the eye not used for sighting and a mechanically or electrically operated opaque shutter is embodied in the sight mechanism.

There is thus provided novel means for eliminating the blinding after-effects of suddenly occurring intense flashes of light upon the sight of a person making observations under conditions of marginal illumination. The novel apparatus of the invention is adapted to prevent the pilot or gunner of a military craft engaged in night combat from being temporarily blinded by flashes of machine gun fire. There is also embodied in the present invention novel light-intercepting shutters and novel means for introducing said light-intercepting shutters in the field of vision of an observer in timed relation to the operation of a gun or other device producing flashes of light.

Although only two embodiments of the invention have been illustrated and described, it is to be expressly understood that the same is not limited thereto. For example, it will now be apparent to those skilled in the art that other types of shutters than those shown may be used in the goggles and that the novel goggles can be used by the observers and gunners directing ground ordnance units, such as anti-aircraft guns. Various changes may be made in the design and arrangement of parts without departing from the spirit and scope of the invention. For a definition of the invention, reference will be had to the appended claims.

What is claimed is:

1. In apparatus of the class described, a spectacle-shaped frame having a housing surrounding each eye opening, a face engaging member attached to said frame, a leaf shutter mounted in each of said housings, the leaves of one of said shutters being formed from a light-transmitting material, such as cellulose acetate plastic darkly colored to absorb light and the leaves of the other of said shutters being formed from an opaque material such as metal, an actuating mechanism for each of said shutters, flexible control means connected to said shutter actuating mechanisms for operating the latter, and means remote from said frame for actuating said control means.

2. In apparatus of the class described, a spectacle-shaped frame having a housing surrounding each eye opening, a face engaging member attached to said frame, a leaf shutter mounted in each of said housings, the leaves of one of said shutters being formed from a darkly colored filter material and the leaves of the other of said shutters being formed from an opaque material, an actuating mechanism for each of said shutters, each of said mechanisms including a solenoid, a source of energy connected to said solenoids, and means remote from said frame for controlling the flow of energy to said solenoids.

3. A pair of protective goggles having shutter mechanisms as the eye pieces therefor, a shutter of dark filter material operatively mounted in one of said mechanisms, and a shutter of opaque material operatively mounted in the other of said mechanisms.

4. In apparatus of the class described, means adapted when operative to produce intense flashes of light, a pair of light shields, one of said shields being opaque and the other being adapted to filter out the blinding rays of said flashes, housing means for said shields for the eyes of an observer, said housing means being adapted for location in a fixed relation to an observer, mechanism for moving one of said shields into the field of vision of one eye of said observer and the other into the field of vision of the other eye of said observer, and means for actuating said mechanism in a predetermined time relation to the operation of said first-named means.

5. In apparatus comprising means adapted when operative to produce intense flashes of light, the combination therewith of light-intercepting means, light filtering means, mechanism for interposing said light-intercepting means in the field of vision of one eye of an observer and for interposing said light filtering means in the field of vision of the other eye of said observer, and means for actuating said mechanism, said last-named means being responsive to the operation of said first-named means.

6. In apparatus of the class described, a gun, an opaque light shield for one eye of an observer, a darkly colored light transmitting shield for the other eye of said observer, housing means for said shields, said housing means being located between said gun and said observer, mechanism for moving said shields into the field of vision of said observer, and means for actuating said mechanism in timed relation to the firing of said gun.

7. In apparatus adapted to protect the wearer from the after-effects of gun flashes, goggles having shutter mechanisms as eye pieces, one of said mechanisms having a darkly colored light-transmitting shutter and the other of said mechanisms having an opaque shutter, said shutter mechanisms being normally held open, and means for actuating said mechanisms to close the same in timed relation to the firing of the gun.

8. In apparatus adapted to protect the wearer from the after-effects of intense light flashes, goggles having shutter mechanisms as eye pieces, one of said mechanisms having a shutter of dark filter material and the other mechanism having an opaque shutter, said shutter mechanisms being normally held open, and remote means for actuating said mechanisms to close the same and interpose said shutters in the field of vision of the wearer.

9. Apparatus of the class described comprising a goggle-like frame adapted to fit closely against the face of an observer and having an aperture in front of each of the observer's eyes, an opaque shutter for one of said apertures, a shutter of light filtering dark material for the other of said apertures, and means for simultaneously opening and closing said shutters.

ROY T. HURLEY.
GEORGE E. MERRITT.